United States Patent
Evans

(10) Patent No.: US 8,819,683 B2
(45) Date of Patent: Aug. 26, 2014

(54) SCALABLE DISTRIBUTED COMPUTE BASED ON BUSINESS RULES

(75) Inventor: Garrick D. Evans, San Francisco, CA (US)

(73) Assignee: Autodesk, Inc., San Rafael, CA (US)

(*) Notice: Subject to any disclaimer, the term of this patent is extended or adjusted under 35 U.S.C. 154(b) by 593 days.

(21) Appl. No.: 12/872,894

(22) Filed: Aug. 31, 2010

(65) Prior Publication Data

US 2012/0054755 A1    Mar. 1, 2012

(51) Int. Cl.
G06F 9/46          (2006.01)
G06F 15/173      (2006.01)

(52) U.S. Cl.
USPC ........... 718/100; 718/102; 718/103; 718/104; 709/223; 709/224; 709/226

(58) Field of Classification Search
USPC .......... 718/100, 102, 103, 104; 709/223, 224, 709/226
See application file for complete search history.

(56) References Cited

U.S. PATENT DOCUMENTS

| | | | |
|---|---|---|---|
| 7,478,361 B2* | 1/2009 | Peteanu et al. | 717/102 |
| 8,191,043 B2* | 5/2012 | Mohindra et al. | 717/121 |
| 2004/0103200 A1* | 5/2004 | Ross et al. | 709/228 |
| 2004/0236547 A1* | 11/2004 | Rappaport et al. | 703/2 |
| 2005/0015471 A1* | 1/2005 | Zhang et al. | 709/221 |
| 2005/0027862 A1* | 2/2005 | Nguyen et al. | 709/225 |
| 2005/0066025 A1* | 3/2005 | Creamer et al. | 709/224 |
| 2006/0050862 A1* | 3/2006 | Shen et al. | 379/219 |
| 2006/0168166 A1* | 7/2006 | Hardwick et al. | 709/221 |
| 2008/0120688 A1* | 5/2008 | Qiu et al. | 726/1 |
| 2009/0300632 A1* | 12/2009 | Falcon et al. | 718/103 |
| 2010/0250747 A1* | 9/2010 | Karaoguz et al. | 709/226 |
| 2011/0078510 A1* | 3/2011 | Beveridge et al. | 714/38.1 |
| 2011/0307523 A1* | 12/2011 | Balani et al. | 707/802 |

OTHER PUBLICATIONS

Amazon Simple Queue Service, http://en.wikipedia.org/wiki/Amazon_Simple_Queue_Service, dated Aug. 11, 2010.

* cited by examiner

Primary Examiner — Charles Swift
(74) Attorney, Agent, or Firm — Gates & Cooper LLP

(57) ABSTRACT

A method, apparatus, system, article of manufacture, and computer-readable storage medium provide the ability to dynamically modify a distributed computing system workflow. A grid application dynamically receives configuration information including business rules that describe execution profiles. Channels based on the one or more execution profiles are defined. Each channel is configured to execute a work request in a distributed grid compute system (based on an execution profile). A first work request is received from a requestor and includes an identity of the requestor. The first work request is evaluated and the identity of the requestor is applied to direct the first work request to the appropriate channel.

26 Claims, 3 Drawing Sheets

SCALABLE DISTRIBUTED COMPUTE BASED ON BUSINESS RULES

BACKGROUND OF THE INVENTION

1. Field of the Invention

The present invention relates generally to distributed computing, and in particular, to a method, system, apparatus, and article of manufacture for managing a workload in a distributed computing environment based on a set of business rules.

2. Description of the Related Art

Distributed computing over fixed and elastic resource pools (compute machine image execution environments) can be configured to scale and balance load (system resource stress) by launching new virtual machines (instances) and can similarly decrease the number of these instances to reduce operational cost. Further, these processes can be programatically driven, that is, based on static or even dynamic heuristics, and leveraging interfaces that report system and application data. In other words, high performance compute grids/clusters with the automatic provisional of computes and load balancing/work distribution has been available in the prior art.

Prior art systems may also provide platforms upon which product groups can build scalable compute-intensive services and other offerings. Such a platform may provide the mechanism for managing requests for work, distributing them to compute instances and coordinating the scaling, balancing, provisioning and integrity management of the instances as well.

However, the prior art distributed computing systems provide for balancing the workload based on the resources of the machines within the distributed system. Thus, the processing is shifted solely based on resource use. Further, the mechanism for determining how processing is distributed cannot be dynamically changed during execution.

In view of the above, what is needed is the ability to influence the processing based on factors other than resources (e.g., a set of business rules) while maintaining the ability to dynamically change the nature of the execution of the application itself.

SUMMARY OF THE INVENTION

One or more embodiments of the invention utilize operating rules defined as a function of business rules/models delivered via configuration that can be injected into a computing grid at any time (startup, while running). The rules and configurations describe the execution profile of the grid application.

The rules can be codified as traits that define channels that describe the communication infrastructure of a grid application. In addition, a methodology provide the ability to filter and dispatch application work requests based on a requestor's identity, entitlements and other information as input to the operating rules to the appropriate application channels.

In addition, embodiments of the invention evaluate grid application runtime performance profiles in terms of operating rules and adjust the elastic topology of the grid application dynamically in response thereto.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

In one or more embodiments of the invention, details pertaining to various different actors may be used to influence the availability, quality, performance and other (including application-specific) characteristics of an application or service running/executing in a grid/distributed computing system. Such influencing actors/characteristics/attributes may include:

(1) the end-user (the individual interacting with the desktop or web front-end application) and his/her individual entitlements as a function of their person, their business affiliation, their payment or subscription or other statuses;

(2) the affiliated entitlements, etc., that represent a non-individual user;

(3) the desktop or web-application (if any) invoking the grid service (including any aggregating apps);

(4) the grid application itself; and (5) the business model of the grid application (including any aggregating models).

To provide such capabilities, embodiments of the invention utilize a system and methodology for incorporating such actors and business models, rules and like logic into methods, systems, and algorithms that drive the coordination and other mechanisms in the grid software such that those desired traits can be defined, essentially, as functions of the grid software.

Hardware Environment

Figure 1:
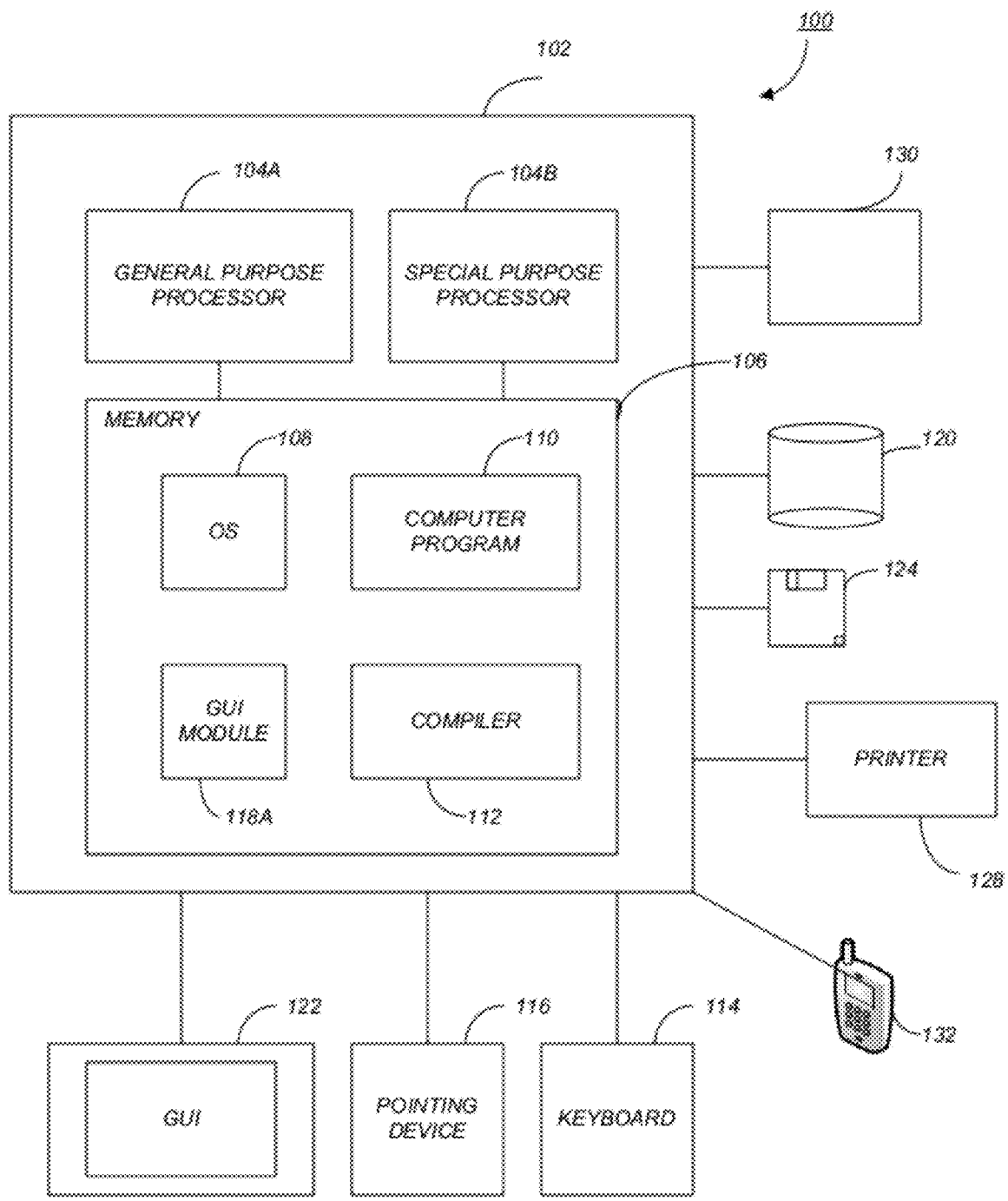
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to a thin client device 132 (e.g., an MP3 player, iPod™, Nook™, portable digital video player, cellular device, personal digital assistant, etc.). Such a device often has limited capabilities in terms of processing, display, and/or memory. However, any type of thin client device 132 may be used in accordance with embodiments of the invention (including devices with capabilities similar to that of computer 102).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cellular phones, notebook computers, pocket computers, or any other device with suitable processing, communication, and input/output capability.

Figure 2:
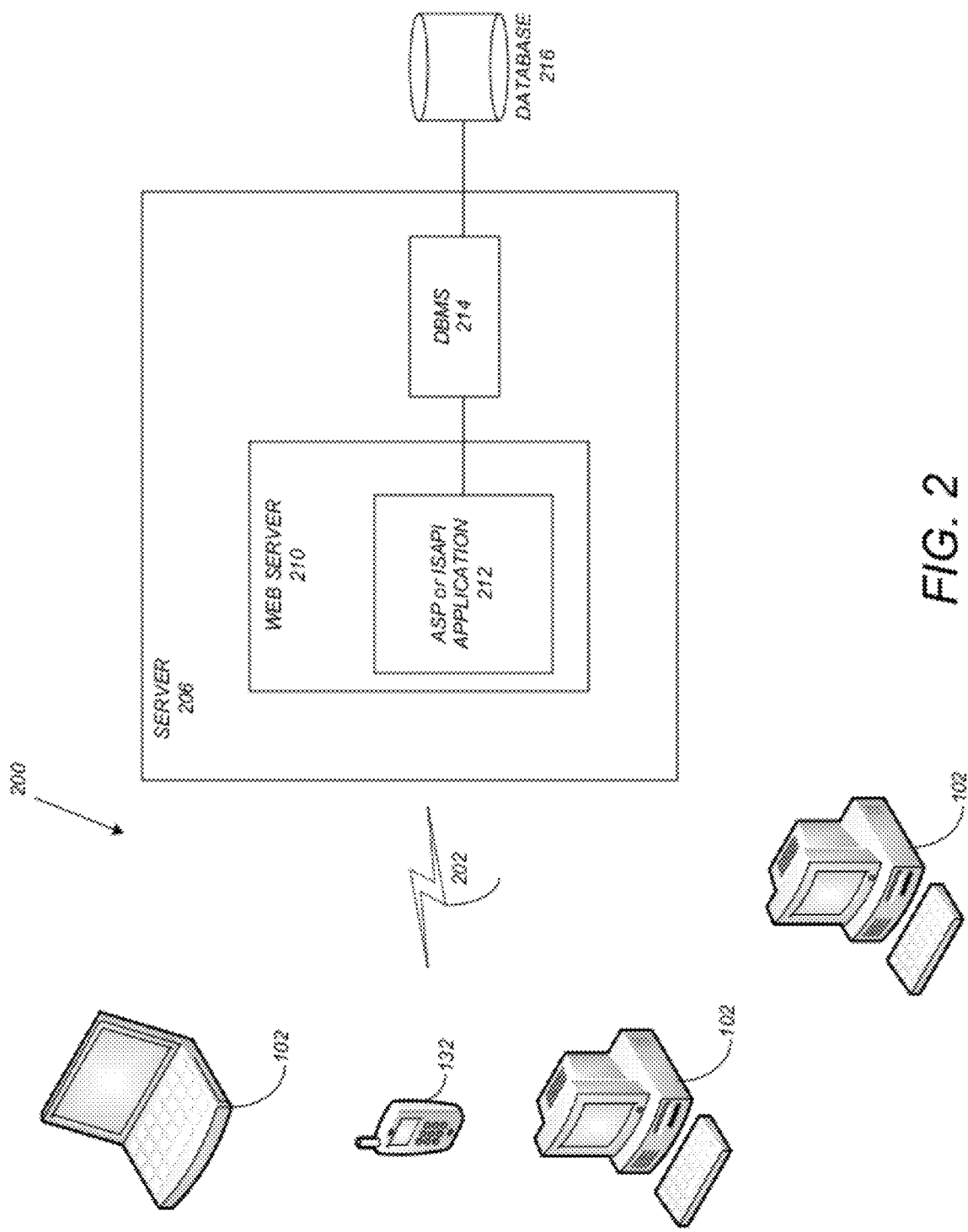
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. As used herein, client devices 102 include thin client devices 132 and/or similar peripherals as described above. A typical combination of resources may include a network 202 comprising the Internet, LANs (local area networks), WANs (wide area networks), SNA (systems network architecture) networks, or the like, clients 102 that are personal computers or workstations and servers 206 that are personal computers, workstations, minicomputers, or mainframes (as set forth in FIG. 1).

A network 202 such as the Internet connects clients 102 and/or thin client devices 132 to server computers 206. Network 202 may utilize ethernet, coaxial cable, wireless communications, radio frequency (RF), a cellular network, etc. to connect and provide the communication between clients 102, thin client devices 132 and servers 206. Clients 102 (including thin client devices 132) may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102/thin client devices 132 may be downloaded from server computer 206 to client computers 102 and installed as a plug-in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 102 instead of communicating/obtaining the information from database 216 across network 202. When a developer encapsulates the business functionality into objects, the system may be referred to as a COM system. Accordingly, the scripts executing on web server 210

(and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

As an alternative to the above, different computing environments may also be used in accordance with embodiments of the invention. For example, a Linux™ or other operating system and corresponding components may be utilized.

Generally, these components 100-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", "thin client device 132" and/or "server computer" is referred to herein, it is understood that such computers 102 and 206, and thin client devices 132, may include portable devices such as cellular phones, notebook computers, pocket computers, personal digital assistants, or any other device with suitable processing, communication, and input/output capability.

Of course, those skilled in the art will recognize that any combination of the above components, or any number of different components, peripherals, and other devices, may be used with computers 102 and 206 and thin client devices 132.

Software Embodiments

Embodiments of the invention can be implemented as part of a distributed or grid based system via a network such as that described in FIG. 2. In a distributed or grid based system, multiple computers 102 may be connected via network 202. In a grid, multiple computer resources from multiple administrative domains (e.g., clients 102/132 and/or servers 206) may be combined to provide a common goal. In other words, grids are a form of distributed computing whereby a "super virtual computer" is composed of many networked loosely coupled computers 102/132/206 acting together to perform very large tasks. Computers in the grid and their resources (e.g., onboard CPUs, storage, power supplies, network interfaces, etc.) are used together to perform a given task that has been distributed across the grid.

To provide the dynamic modification of the execution of an application in such a distributed system, two subsystems may be utilized (in addition to configuration) within a grid software system. Referring again to FIG. 2, the grid may be established using a server 206 as a grid's work or front-end subsystem. This subsystem provides the input, scheduling, queuing and dispatching infrastructure for work requests and job definition.

A grid app/service is invoked initially as an HTTP (hypertext transfer protocol) method on the web service (e.g., an application 212 of web server 210) (of the grid) that forms the initial work request. Such an initial work request may originate from any of the computers 102/132 or server 206 that is part of the grid computing system. The request must contain the caller's identity (e.g., defined and facilitated by an identity service that unique identifies that user in a public or private network). Such an identity service may require the user to sign in (e.g., via username and password) and/or may use hardware based attributes to uniquely identify a user/caller.

From the identity of the user information (and potentially through the identity service), the grid (i.e., the front end system 206) will obtain a set of information derived from this identity that can be used by the grid application/service business owner to define a set of traits. These traits may be realizations of one or more of the following: quality of service, scalability potential, etc. These realizations are referred to as channels. A channel is a manifestation of these traits in that they are implementations of work requests and app/service job communication pathways (and ultimately to the compute instances themselves) that comprise the grid app/service itself.

As an example, consider a rendering service that is well-behaved and scales deterministically (time/frame and resources/frame are positively correlated). This service may be offered as a business model in two tiers: free and premium. Suppose the free version is defined in the following manner: (1) responds to work at a lower priority than the premium version; and (2) is limited to some number, N, of compute instances per job and is capped, overall, at some number P total compute instances. Suppose the premium version is defined as: (1) always has a response higher priority; (2) guarantees some number of instances per per, M where M>N; (3) allows for more than M instances per job if average time taken per instance falls below some time T; and (4) has unlimited system scale.

The above rules are first realized as two primary application channels: (1) "free"; and (2) "premium". To satisfy the first constraint (i.e., relating to priority), the channels can be composed of different components. For example, the free channel might use a queue backed by Amazon's™ SQS™ (simple queue service) while the premium channel may leverage a low latency implementation. The composition of these objects is one piece of the invention.

Compute instances, or workers, are configured so the system knows which can handle jobs from each channel. The baseline topology is thus established. The system then reacts to standard heuristics like hardware/resource monitors to adjust the topology (spawn or shutdown) workers according to the rules. As a result, there will never be more than P workers handling free jobs.

The system may also inspect the channels in real time, evaluating need based on explicit methods like queue depth and implicit techniques like trends in average worker times to completion rates. The scaling (i.e., that adjusts the topology) is constrained by the business rules that may codify orthogonal areas of concern such as total cost containment, job or time base pricing as so forth.

In one or more embodiments, incoming work requests are evaluated and the identity (and its associated details) of the requester are applied to determine and direct the request into the appropriate channel (or rejecting the request out right if it fails to satisfy any set of criteria).

In view of the above, one may note that prior art systems may provide automatic scaling and rules-based provisioning in fixed and elastic, virtualized and non-virtualized resource environments. Additionally, the notion of quality of service and deploying applications in these terms may also be available in the prior art. However, embodiments of the invention provide the ability to introduce a multiplicity of different factors as the means to define the behavior of a multi-tenant distributed application. In this regard, the layering of business rules over more traditional heuristics as described herein is not available in the prior art.

In other words, embodiments of the invention provide the capability of having numerous execution profiles for a single application or service defined by the aggregation of traits that reflect business rules and service models that can additionally be dynamically injected into the system configuration for real-time runtime modification. Accordingly, the behavior of a cloud application or service based can be dynamically changed based on new business concepts, pricing, subscription models, etc. Thus, embodiments of the invention can expedite the process of updating/attempting new business models for cloud-based services.

Logical Flow

Figure 3:
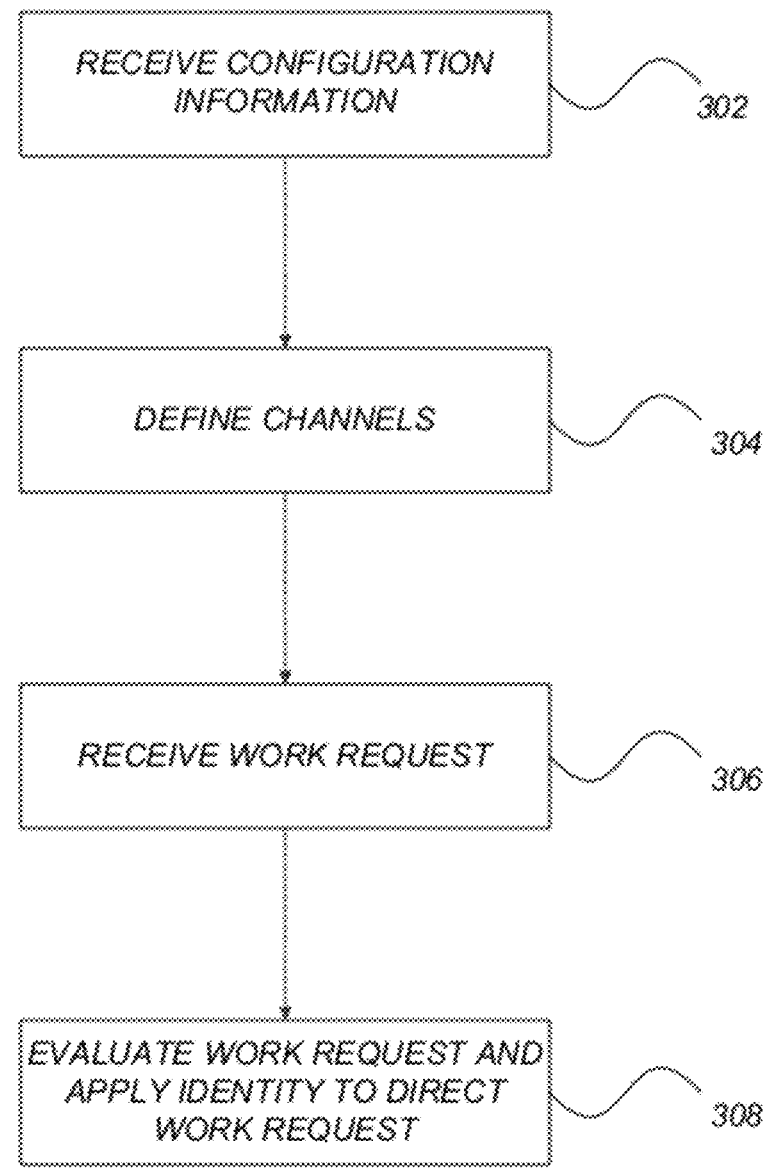
FIG. 3 is a flow chart illustrating the logical flow for dynamically modifying a distributed computing system workflow in accordance with one or more embodiments of the invention.

FIG. 3 is a flow chart illustrating the logical flow for dynamically modifying a distributed computing system workflow in accordance with one or more embodiments of the invention.

At step 302, configuration information is dynamically received in a grid application. Such confirmation information comprises one or more business rules that describe one or more execution profiles of the grid application. In one or more embodiments, the configuration information defines a pricing structure for a level of service of the requestor. The configuration information may be dynamically received during runtime execution of the grid application or at start-up of the grid application.

At step 304, one or more channels are defined based on the execution profiles. Each channel is configured to execute one or more work requests in a distributed grid compute system in accordance with one of the execution profiles. Note that the configuration information from step 302 may define channels that describe a communication infrastructure of the grid application.

At step 306, a first work request is received in the grid application from a requestor. The first work request is a request to perform a process in the grid compute system and further includes an identity of the requestor. Such a request may be an HTTP method invoked on a webs service.

At step 308, the first work request is evaluated and the identity is applied to the request to direct the request to one of the channels. Accordingly, various different types of requestors may result in the use of different channels based on the entitlements of the requestor. For example, the identity of the requestor may identify an end-user. As a result, the work request may be directed to a channel based on individual entitlements of the end-user as a function of the end-user's person, business affiliation, and payment or subscription. Alternatively, if the requestor is identified as a non-individual user, the work request is directed to a channel based on entitlements of the non-individual user. For example, if the requestor is an application, entitlements based on the channel may dictate where the work request is routed/directed.

As part of step 308, the grid application may also monitor hardware resources and adjust a topology of the distributed grid compute system based on the monitoring (and in accordance with the execution profile and the identity of the requestor).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide the ability to dynamically manage a distributed compute system workflow. The nature of the execution of an application can be dynamically changed based on business rules that are not a function of the hardware resources. These business rules can be dynamically adjusted during execution/processing of a grid application. For example, if an entity desires to offer a new pricing structure for a given software (e.g., adding a premier pricing tier to a prior structure that was free or limited access). The business rules and configuration information can be dynamically received by a grid application and deployed automatically. The business rules and pricing tier specified therein are captured in the form of a channel/processing channel for users falling within that pricing tier.

When a request from a user is received, the identity of the user is examined to determine which pricing structure/channel the user's request is routed to. If the user is a subscriber, the request may be routed to the premium channel, while if the user is a pay-as-you-go customer, the request may be routed to the free channel. Such a pricing structure enables requests in the premium channel to have priority processing, dedicated hardware resources, dedicated bandwidth capabilities, etc. The system may monitor resources in terms of the rules/entitlements of the user and auto-scale or adjust the topology of the grid compute system to provide the level of service guaranteed if possible. Further, customers/end-users can also dynamically change the pricing structure and entitlements to which they are granted. For example, a user may upgrade from a free service to a premium service and the grid application of the invention will automatically redirect any work requests from the user (regardless of the whether the work request is already executing in a different channel, is waiting for execution in a queue, etc.) to the premium service.

In view of the above, embodiments of the invention enables/allows different types of information (e.g., different from hardware resource based information) to be utilized to drive changes to a grid compute system dynamically. In this regard, user profiles (e.g., accessed via an identity of the user) may be used as input to determine the appropriate channel to route work requests. User profiles may vary from individual based user profiles (e.g., different users may be have different entitlements) to that of an application itself (e.g., different applications may have different entitlements). The nature of the configuration information and user profile based information may be generally categorized as different levels of identity in an execution context. For example, different levels may include individuals, license holders, subscription holders, application or web services executing on behalf of a client. Alternatively, different levels may include pricing models, internal cost structures, etc. Accordingly, embodiments of the invention provide the ability to change pricing tiers, subscription models, etc. dynamically where such changes also affect the quality of service of the application.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for dynamically modifying a distributed computing system workflow, comprising:

(a) dynamically receiving, in a multi-tenant grid application, configuration information comprising one or more business rules that define one or more execution profiles of the grid application, wherein:

(i) the one or more execution profiles describe a runtime behavior of the grid application executing in a distributed grid compute system; and (ii) the distributed grid compute system comprises multiple computer resources from multiple administrative domains that are used together to perform a given task;

(b) defining one or more channels based on the one or more execution profiles, wherein:
  (i) each channel is configured to execute one or more work requests in the distributed grid compute system in accordance with one of the execution profiles;
  (ii) each channel comprises an implementation of one or more of the one or more work requests and an application/service job communication pathway to define a manifestation of one or more traits; and
  (iii) the one or more traits reflect the one or more business rules and/or service models;
(c) receiving, in the grid application, a first work request of the one or more work requests from a requestor, wherein the first work request comprises a request to perform a process in the distributed grid compute system and an identity of the requestor;
(d) evaluating the first work request; and
(e) based on the identity of the requestor, directing the first work request to one of the one or more channels.

2. The computer-implemented method of claim 1, wherein the configuration information is received dynamically during run-time execution of the grid application.

3. The computer-implemented method of claim 1, wherein the configuration information is received dynamically at start-up of the grid application.

4. The computer-implemented method of claim 1, wherein the configuration information defines one or more channels that describe a communication infrastructure of the grid application.

5. The computer-implemented method of claim 1, wherein the work request comprises a hypertext transfer protocol (HTTP) method invoked on a web service.

6. The computer-implemented method of claim 1, further comprising:
  monitoring hardware resources to produce a result; and
  adjusting a topology of the distributed grid compute system based on the result of the monitoring and in accordance with the execution profile and the identity of the requestor.

7. The computer-implemented method of claim 1, wherein the configuration information comprises a pricing structure for a level of service of the requestor.

8. The computer-implemented method of claim 1, wherein:
  the identity of the requestor identifies an end-user; and
  the channel, that the first work request is directed to, is based on individual entitlements of the end-user as a function of the end-user's person, business affiliation, and payment or subscription.

9. The computer-implemented method of claim 1, wherein:
  the identity of the requestor identifies a non-individual user; and
  the channel, that the first work request is directed to, is based on entitlements of the non-individual user.

10. The computer-implemented method of claim 1, wherein:
  the identity of the requestor identifies an application; and
  the channel, that the first work request is directed to, is based on entitlements of the application.

11. An apparatus for dynamically modifying a distributed computing system workflow in a computer system comprising:
  (a) a server computer having a memory;
  (b) a multi-tenant grid application executing on the computer, wherein the grid application is configured to:
    (i) dynamically receive configuration information comprising one or more business rules that define one or more execution profiles of the grid application, wherein:
      (1) the one or more execution profiles describe a runtime behavior of the grid application executing in a distributed grid compute system; and
      (2) the distributed grid compute system comprises multiple computer resources from multiple administrative domains that are used together to perform a given task;
    (ii) define one or more channels based on the one or more execution profiles, wherein:
      (1) each channel is configured to execute one or more work requests in the distributed grid compute system in accordance with one of the execution profiles;
      (2) each channel comprises an implementation of one or more of the one or more work requests and an application/service job communication pathway to define a manifestation of one or more traits; and
      (3) the one or more traits reflect the one or more business rules and/or service models;
    (iii) receive a first work request of the one or more work requests from a requestor, wherein the first work request comprises a request to perform a process in the distributed grid compute system and an identity of the requestor;
    (iv) evaluate the first work request; and
    (v) based on the identity of the requestor, directing the first work request to one of the one or more channels.

12. The apparatus of claim 11, wherein the configuration information is received dynamically during run-time execution of the grid application.

13. The apparatus of claim 11, wherein the configuration information is received dynamically at start-up of the grid application.

14. The apparatus of claim 11, wherein the configuration information defines one or more channels that describe a communication infrastructure of the grid application.

15. The apparatus of claim 11, wherein the work request comprises a hypertext transfer protocol (HTTP) method invoked on a web service.

16. The apparatus of claim 11, wherein the grid application is further configured to:
  monitor hardware resources to produce a result; and
  adjust a topology of the distributed grid compute system based on the result of the monitoring and in accordance with the execution profile and the identity of the requestor.

17. The apparatus of claim 11, wherein the configuration information comprises a pricing structure for a level of service of the requestor.

18. The apparatus of claim 11, wherein:
  the identity of the requestor identifies an end-user; and
  the channel, that the first work request is directed to, is based on individual entitlements of the end-user as a function of the end-user's person, business affiliation, and payment or subscription.

19. The apparatus of claim 11, wherein:
  the identity of the requestor identifies a non-individual user; and
  the channel, that the first work request is directed to, is based on entitlements of the non-individual user.

20. The apparatus of claim 11, wherein:
the identity of the requestor identifies an application; and
the channel, that the first work request is directed to, is based on entitlements of the application.

21. A non-transitory computer-readable storage medium encoded with computer program instructions which when accessed by a client computer cause the client computer to load the program instructions to a memory therein creating a special purpose data structure causing the client computer to operate as a specially programmed client computer, executing a method of dynamically modifying a distributed computing system workflow, comprising:
 (a) dynamically receiving, in a multi-tenant grid application executing in the specially programmed client computer, configuration information comprising one or more business rules that define one or more execution profiles of the grid application, wherein:
  (i) the one or more execution profiles describe a runtime behavior of the grid application executing in a distributed grid compute system; and
  (ii) the distributed grid compute system comprises multiple computer resources from multiple administrative domains that are used together to perform a given task;
 (b) defining, in the grid application executing in the specially programmed client computer, one or more channels based on the one or more execution profiles, wherein:
  (i) each channel is configured to execute one or more work requests in the distributed grid compute system in accordance with one of the execution profiles;
  (ii) each channel comprises an implementation of one or more of the one or more work requests and an application/service job communication pathway to define a manifestation of one or more traits; and
  (iii) the one or more traits reflect the one or more business rules and/or service models;
 (c) receiving, in the grid application executing in the specially programmed client computer, a first work request of the one or more work requests from a requestor, wherein the first work request comprises a request to perform a process in the distributed grid compute system and an identity of the requestor;
 (d) evaluating, in the grid application executing in the specially programmed client computer, the first work request; and
 (e) based on the identity of the requestor, directing, in the grid application executing in the specially programmed client computer, the first work request to one of the one or more channels.

22. The computer-readable storage medium of claim 21, wherein the configuration information is received dynamically during run-time execution of the grid application.

23. The computer-readable storage medium of claim 21, wherein the configuration information defines one or more channels that describe a communication infrastructure of the grid application.

24. The computer-readable storage medium of claim 21, further comprising:
monitoring hardware resources to produce a result; and
adjusting a topology of the distributed grid compute system based on the result of the monitoring and in accordance with the execution profile and the identity of the requestor.

25. The computer-readable storage medium of claim 21, wherein the configuration information comprises a pricing structure for a level of service of the requestor.

26. The computer-readable storage medium of claim 21, wherein:
the identity of the requestor identifies an end-user; and
the channel, that the first work request is directed to, is based on individual entitlements of the end-user as a function of the end-user's person, business affiliation, and payment or subscription.

* * * * *